United States Patent [19]
Goto et al.

[11] 4,366,798
[45] Jan. 4, 1983

[54] FUEL MIXTURE HEATING DEVICE OF AN INTERNAL COMBUSTION ENGINE

[75] Inventors: Shuji Goto; Kazuyoshi Tasaka; Masaru Tanaka, all of Toyota, Japan

[73] Assignee: Toyota Jidosha Kogyo Kabushiki Kaisha, Toyota, Japan

[21] Appl. No.: 200,097

[22] Filed: Oct. 23, 1980

[30] Foreign Application Priority Data

Oct. 30, 1979 [JP] Japan .......................... 54/149473[U]

[51] Int. Cl.³ ............................................ F02M 31/00
[52] U.S. Cl. .................................. 123/549; 123/545; 261/142; 219/206
[58] Field of Search ............... 123/549, 552, 548, 545; 219/205, 206, 207; 261/142

[56] References Cited
U.S. PATENT DOCUMENTS

| | | | |
|---|---|---|---|
| 1,079,338 | 11/1913 | Hazelton | 123/545 |
| 1,611,299 | 12/1926 | Wilka | 123/545 |
| 4,108,125 | 8/1978 | Marcoux | 123/549 |
| 4,108,953 | 8/1978 | Rocco | 123/545 |
| 4,242,999 | 1/1981 | Hoser | 123/548 |
| 4,246,880 | 1/1981 | Henke | 123/549 |
| 4,300,513 | 11/1981 | Ray | 123/545 |
| 4,303,050 | 12/1981 | Platzen | 123/549 |
| 4,308,845 | 1/1982 | Sarto | 123/549 |
| 4,313,413 | 2/1982 | Miyoshi | 123/549 |

*Primary Examiner*—Ronald H. Lazarus
*Attorney, Agent, or Firm*—Stevens, Davis, Miller & Mosher

[57] ABSTRACT

A fuel mixture heating device of an internal combustion engine having a downdraft type carburetor mounted on the collecting portion of the intake manifold. A hollow cylindrical heater vessel is arranged at the lower end of the air horn of the carburetor. The heater vessel comprises an inner pipe, an outer pipe and PTC elements inserted between the inner pipe and the outer pipe for heating the inner pipe before the completion of warm-up of the engine. The inner pipe has a thin wall having a corrugated cross-section. The inner wall of the PTC elements are in contact with the outer wall of the inner pipe. An air gap is present between the outer pipe and the outer walls of the PTC elements. A plurality of plate springs is inserted between the outer pipe and the corresponding PTC elements.

5 Claims, 5 Drawing Figures

FUEL MIXTURE HEATING DEVICE OF AN INTERNAL COMBUSTION ENGINE

DESCRIPTION OF THE INVENTION

The present relates to a fuel mixture heating device of an internal combustion engine.

Since the temperature of an engine is normally low before the completion of warm-up of the engine, the vaporization of the fuel fed from the carburetor is not fully promoted. As a result of this, since a large amount of the fuel is fed into the cylinder of the engine in the form of liquid fuel, good combustion cannot be obtained and, therefore, a problem occurs in that it is difficult to ensure a stable combustion of the engine. Consequently, in a conventional engine, in order to ensure a stable combustion, a mixture, which is richer than the mixture fed into the cylinder after the completion of warm-up of the engine, is normally fed into the cylinder before the completion of warm-up of the engine. However, in the case wherein such a richer mixture is fed into the cylinder as in a conventional engine, problems occur in that the amount of harmful HC and CO components in the exhaust gas is increased and, in addition, specific fuel consumption of the engine is increased. Nevertheless, if it is possible to fully promote the vaporization of the mixture fed into the cylinder before the completion of warm-up of the engine, it is possible to obtain a stable combustion, even if the air-fuel ratio of the mixture fed into the cylinder is increased. In addition, since it is possible to increase the air-fuel ratio of the mixture fed into the cylinder, the amount of harmful HC and CO components in the exhaust gas can be reduced and, also, specific fuel consumption can be improved. In order to promote the vaporization of the fuel before the completion of warm-up of the engine, a fuel vaporization promoting device has been known, in which the riser portion of the intake manifold is heated by the exhaust gas which is introduced to the riser portion from the exhaust system of the engine. However, in such a conventional fuel vaporization promoting device, in which the heat of the exhaust gas is used for promoting the vaporization of the fuel, there is a disadvantage in that it is difficult to promote the vaporization of the fuel immediately after the engine is started, because the temperature of the exhaust gas is not instantaneously increased after the engine is started. In order to eliminate the above disadvantage, a fuel vaporization promoting device has been proposed, in which a Positive Temperature Coefficient Thermister element (hereinafter referred to as a PTC element) having a honeycomb construction is inserted between the intake manifold and the carburetor for heating the entire mixing flowing into the intake manifold from the carburetor. However, a large part of the mixture fed from the carburetor flows on the inner wall of the air horn of the carburetor in the form of liquid fuel and, therefore, in order to promote the vaporization of the fuel fed from the carburetor, it is necessary to concentrically heat the liquid fuel flowing along the inner wall of the air horn of the carburetor. Nevertheless, in this fuel vaporization promoting device, only a small part of the heat issued from the PTC element is used for heating the liquid fuel, while the remaining large part of the heat issued from the PTC element is used for heating air. Consequently, in this fuel vaporization promoting device, a satisfactory vaporization of the liquid fuel cannot be obtained and, in addition, since air is positively heated, a problem occurs in that volumetric efficiency is reduced.

An object of the present invention is to provide a fuel mixture heating device of an internal combustion engine, which is capable of fully promoting the vaporization of liquid fuel in such a way that a large part of the heat issued from the heat source is used for heating the liquid fuel.

According to the present invention, there is provided a fuel mixture heating device of an internal combustion engine having an intake manifold and an intake passage which has an outlet connected to a collecting portion of the intake manifold, the intake passage having a fuel feed apparatus for feeding fuel into the intake passage, said device comprising: a power source, and; a generally hollow cylindrical heater vessel arranged at the outlet of the intake passage and having an outlet portion which projects into the collecting portion of the intake manifold, said heater vessel comprising a hollow inner pipe having an outer wall, a hollow cylindrical outer pipe arranged around said inner pipe and heating means connected to said power source and being in contact with the outer wall of said inner pipe, said inner pipe arranged to be aligned with the intake passage and having a thin wall which has a corrugated cross-section.

The present invention may be more fully understood from the description of preferred embodiments of the invention set forth below, together with the accompanying drawings.

DESCRIPTION OF PREFERRED EMBODIMENTS

Figure 1:
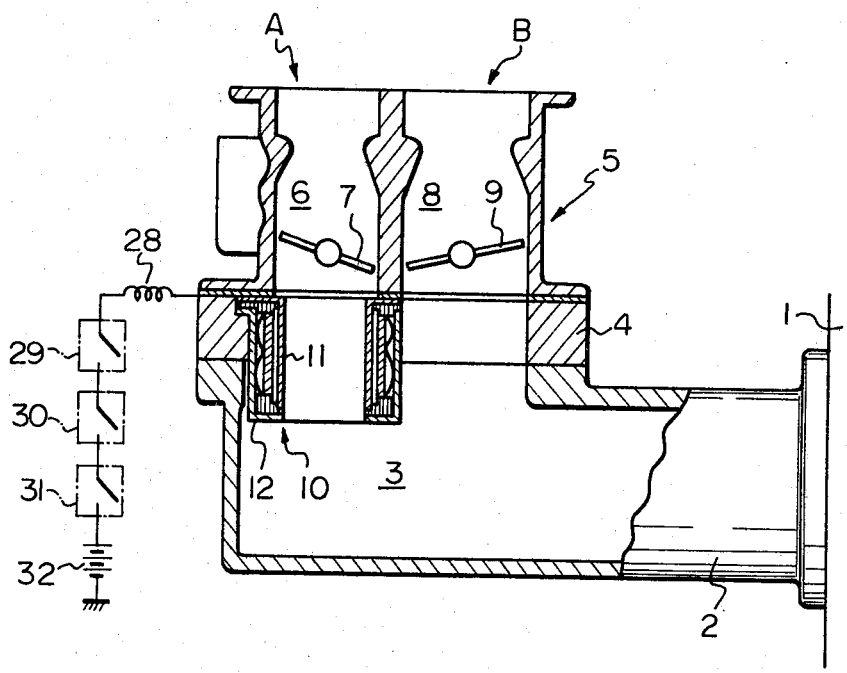
FIG. 1 is a cross-sectional side view of an intake system of an engine, illustrating an embodiment of a fuel mixture heating device according to the present invention.
Figure 2:
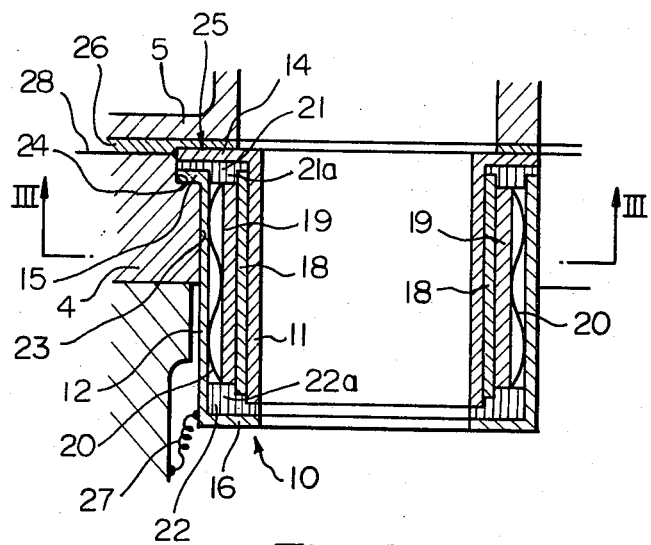
FIG. 2 is an enlarged cross-sectional view of a portion of the intake system illustrated in FIG. 1, taken along the line II—II in FIG. 3.
Figure 3:
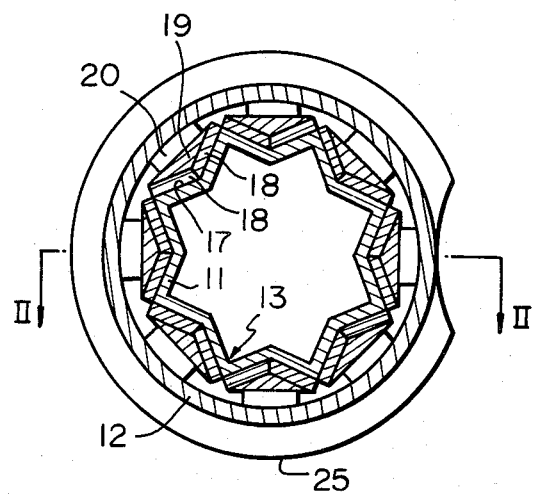
FIG. 3 is a cross-sectional view taken along the line III—III in FIG. 2.

Referring to FIG. 1, 1 designates an engine body, 2 an intake manifold, 3 a collecting portion of the intake manifold 2, and 4 a heat insulating plate; 5 designates a carburetor fixed onto the intake manifold 2 via the heat insulating plate 4. The carburetor 5 comprises a primary carburetor A having a vertically extending primary air horn 6 and a primary throttle valve 7, and a secondary carburetor B having a vertically extending secondary air horn 8 and a secondary throttle valve 9. As illustrated in FIGS. 1 and 2, a hollow cylindrical heater vessel 10, having an inner diameter which is almost the same as that of the primary air horn 6, is arranged in the heat insulating plate 4 located beneath the primary carburetor A so that the lower portion of the heater vessel 10 projects into the collecting portion 3 of the intake manifold 2. As illustrated in FIGS. 2 and 3, the heater vessel 10 comprises an inner pipe 11 having a saw tooth shaped cross-section, and a cylindrical outer pipe 12. The pipes 11 and 12 have a thin wall and are made of a material, such as an aluminum alloy, having a high thermal conductivity. In addition, the inner pipe 11 is so arranged that the major diameter portions 13 (FIG. 3) thereof are aligned with the inner wall of the primary air horn 6. The inner pipe 11 has on its upper end a horizontally outwardly extending upper flange 14 formed in one piece thereon, and the outer pipe 12 has on its upper end a horizontally outwardly extending upper flange 15 formed in one piece thereon. In addition, the outer pipe 12 has on its lower end a horizontally inwardly extending lower flange 16 formed in one piece thereon. A plurality of V-shaped recesses 17 is continuously formed on the outer wall of the inner pipe 11, and a pair of flat plate shaped PTC elements 18 is provided for each recess 17. In addition, a plurality of PTC element supporting members 19 is arranged on the outer walls of the corresponding paired PTC elements 18, and a plurality of plate springs 20 is inserted between the corresponding PTC element supporting members 19 and the outer pipe 12. Therefore, the PTC elements 18 are urged onto the outer wall of the inner pipe 11 via the corresponding PTC element supporting members 19 due to the spring force of the corresponding plate springs 20. Consequently, the inner walls of the PTC elements 18 are electrically connected to the inner pipe 11, and the outer walls of the PTC elements 18 are electrically connected to the outer pipe 12 via the corresponding PTC element supporting members 19 and the corresponding plate springs 20. As illustrated in FIG. 2, an insulation ring 21, made of, for example, silicon rubber, is inserted between the upper flange 14 of the inner pipe 11 and the upper flange 15 of the outer pipe 12 so as to cover the upper end face of the PTC elements 18. In addition, an insulation ring 22, made of, for example, silicon rubber, is inserted between the lower end of the inner pipe 11 and the lower flange 16 of the outer pipe 12 so as to cover the lower end face of the PTC elements 18. In addition, the insulation rings 21 and 22 have projecting portions 21a and 22a which extend to the upper ends and the lower ends of the PTC element supporting members 19, respectively, for supporting the PTC element supporting members 19, and each of the PTC elements 18 is maintained at its initial position by the projecting portions 21a, 22a.

As illustrated in FIG. 2, the heat insulating plate 4 has a hole 23 having an inner diameter which is almost the same as the outer diameter of the outer pipe 12, and the heater vessel 10 is inserted into the hole 23. In addition, the hole 23 of the heat insulating plate 4 has on its upper end an increased diameter portion 24, and a flange 25 of the heater vessel 10, which has a composite construction comprising the upper flanges 14, 15, and the insulation ring 21, is inserted into the increased diameter portion 24 of the hole 23. From FIG. 2, it will be understood that the flange 25 has a height which is higher than that of the increased diameter portion 24. Consequently, when the carburetor 5 is fixed onto the heat insulating plate 4 via a gasket 26 having a uniform width, the inner pipe 11 is strongly pressed downward. As a result of this, since the insulation ring 22 completely closes the gap between the lower end of the inner pipe 11 and the lower flange 16 of the outer pipe 12, it is possible to completely prevent the mixture from entering between the inner pipe 11 and the outer pipe 12 via the gap between the lower end of the inner pipe 11 and the lower flange 16 of the outer pipe 12.

As illustrated in FIG. 2, the outer pipe 12 is connected to the intake manifold 2 via a lead 27. In addition, one end of the lead 28 is connected to the inner pipe 11 and, as illustrated in FIG. 1, the other end of the lead 28 is connected to a power source 32 via a temperature reactive switch 29, a voltage reactive switch 30 and an ignition switch 31. The temperature reactive switch 29 is in the ON position when the temperature of the cooling water of the engine is lower than, for example, 60° C., while the temperature reactive switch 29 is turned to the OFF position when the temperature of the cooling water of the engine exceeds 60° C. The voltage reactive switch 30 is in the OFF position when the voltage, produced at the neutral point of the alternator (not shown) driven by the engine, is lower than a predetermined level, while the voltage reaction switch 30 is turned to the ON position when the voltage, produced at the neutral point of the alternator, is increased beyond the predetermined level.

As is known to those skilled in the art, a large amount of electric current flows within the PTC elements 18 when the supply of the electric current is started. Consequently, during the time the starter motor (not shown) is operated for starting the engine, it is necessary that the supply of the electric current not be fed into the PTC elements 18. To this end, the voltage reactive switch 30 is provided. That is, when the engine is compulsorily rotated by the starter motor, the voltage, produced at the neutral point of the alternator, is very low. On the other hand, when the engine begins to rotate under its own power, the voltage, produced at the neutral point of the alternator, is increased. As a result of this, the voltage reactive switch 30 is turned to the ON position and, thus, an electric current begins to be fed into the PTC elements 18. When the feed of the electric current is started, as mentioned above, the temperature of the PTC elements 18 is instantaneously increased and, as a result, the temperature of the inner pipe 11 is instantaneously increased.

When the engine is started, a large part of the fuel fed from the primary carburetor A flows downward on the inner wall of the primary air horn 6 in the form of liquid fuel and then flows downward on the saw tooth shaped inner wall of the inner pipe 11 of the heater vessel 10. Consequently, the liquid fuel, flowing downward on the inner wall of the inner pipe 11, is heated by the inner pipe 11 and, thus, vaporization of the liquid fuel is promoted. As illustrated in FIG. 2, an air gap is present between the PTC element supporting members 19 and the outer pipe 12 and, therefore, only an extremely small part of the heat issued from the PTC elements 18 escapes to the outer pipe 12 via the PTC element supporting members 19 and the plate springs 20. Consequently, a large part of the heat issued from the PTC elements 18 is used for heating the inner pipe 11. In addition, the inner wall of the inner pipe 11 is covered by the liquid fuel and, thus, a large part of the heat issued from the PTC elements 18 is used for promoting the vaporization of the liquid fuel. Furthermore, since the inner pipe 11 has the saw tooth shaped inner wall, the area of the thermal conductive surface of the inner pipe 11 becomes larger as compared with the case wherein the inner pipe 11 has a cylindrical inner wall and, thus, a good vaporization of the fuel can be obtained.

When the temperature of the cooling water of the engine exceeds 60° C. a little while after the engine is started, the temperature reactive switch 29 is turned to the OFF position and, as a result, the supply of the electric current fed into the PTC elements 18 is stopped.

Figure 4:
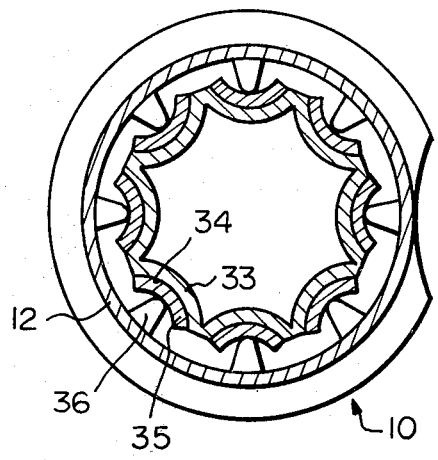
FIG. 4 is a cross-sectional view of another embodiment according to the present invention.

FIG. 4 illustrates another embodiment. In this embodiment, the inner wall of the inner pipe 33 of the heater vessel 10 has an inwardly convex continuous arc shaped cross-section. A plurality of arc shaped recesses 34 is formed on the outer wall of the inner pipe 33, and a plurality of arc shaped PTC elements 35 is arranged in the corresponding recesses 34. The PTC elements 35 are urged on the outer wall of the inner pipe 33 due to the spring force of plate springs 36 which are inserted between the outer pipe 12 and the PTC elements 35.

Figure 5:
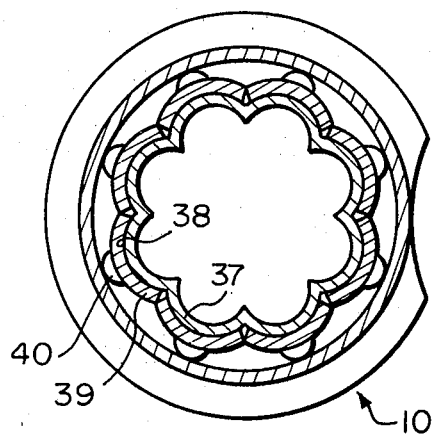
FIG. 5 is a cross-sectional view of a further embodiment according to the present invention.

FIG. 5 illustrates a further embodiment. In this embodiment, the inner wall of the inner pipe 37 of the heater vessel 10 has an outwardly convex continuous arc shaped cross-section. A plurality of arc shaped projections 38 is formed on the outer wall of the inner pipe 37, and a plurality of arc shaped PTC elements 39 is arranged on the corresponding projections 38. The PTC elements 39 are urged onto the outer wall of the inner pipe 37 due to the spring force of plate springs 40 which are inserted between the outer pipe 12 and the PTC elements 39.

According to the present invention, since the large part of the heat issued from the PTC elements is used for heating liquid fuel, it is possible to fully promote the vaporization of the liquid fuel. Consequently, even if a fuel mixture, which is leaner than that used in a prior art, is used before the completion of warm-up of the engine, good combustion can be obtained and, thus, a stable operation of the engine can be ensured. In addition, since it is possible to use such a leaner mixture before the completion of warm-up of the engine, the amount of harmful components can be reduced, and specific fuel consumption can be reduced.

While the invention has been described by reference to specific embodiments chosen for purposes of illustration, it should be apparent that numerous modifications could be made thereto by those skilled in the art without departing from the basic concept and scope of the invention.

We claim:

1. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
   a power source;
   a generally hollow cylindrical heater vessel arranged at the outlet of the intake passage and having an outlet portion which projects into the collecting portion of the intake manifold, said heater vessel comprising a hollow inner pipe having an outer wall, a hollow cylindrical outer pipe arranged around said inner pipe and heating means connected to said power source and being in contact with the outer wall of said inner pipe, said inner pipe arranged to be aligned with the intake passage and having a thin wall which has a corrugated cross-section, said corrugated wall of said inner pipe comprising a plurality of continuous corrugated portions, each said corrugated portion having substantially the same inwardly convex arc shaped cross-section and an arc shaped concave outer wall, said heating means comprising a plurality of PTC elements, each said PTC element having an arc shaped cross-section and being arranged to be in contact with corresponding arc shaped concave outer wall, at least one PTC element being provided for each said corrugated portion.

2. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
   a power source;
   a generally hollow cylindrical heater vessel arranged at the outlet of the intake passage and having an outlet portion which projects into the collecting portion of the intake manifold, said heater vessel comprising a hollow inner pipe having an outer wall, a hollow cylindrical outer pipe arranged around said inner pipe and heating means connected to said power source and being in contact with the outer wall of said inner pipe, said inner pipe arranged to be aligned with the intake passage and having a thin wall which has a corrugated cross-section, said corrugated wall of said inner pipe comprising a plurality of continuous corrugated portions, each said corrugated portion having substantially the same outwardly convex arc shaped cross-section and an arc shaped convex outer wall, said heating means comprising a plurality of PTC elements, each said PTC element having an arc shaped cross-section and being arranged to be in contact with said corresponding arc shaped convex outer wall, at least one said PTC element being provided for each said corrugated portion.

3. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
   a power source;
   a generally hollow cylindrical heater vessel arranged at the outlet of the intake passage and having an outlet portion which projects into the collecting portion of the intake manifold, said heater vessel comprising a hollow inner pipe having an outer wall, a hollow cylindrical outer pipe arranged around said inner pipe and heating means connected to said power source and being in contact with the outer wall of said inner pipe, said inner pipe arranged to be aligned with the intake passage and having a thin wall which has a corrugated cross-section;
   a heating insulating plate having a hole and inserted between the intake passage and the collecting portion of the intake manifold, said heater vessel being inserted into the hole of said heat insulating plate, said heater vessel having an outwardly extending flange portion at an inlet portion thereof, which is located opposite to the outlet portion of said heater vessel, the hole of said heat insulating plate having an increased diameter portion into which the flange portion of heater of said heater vessel is inserted, said inner pipe having an outwardly extending flange at said inlet portion, said outer pipe having an outwardly extending flange at said inlet portion;
   said flange portion comprising the flange of said inner pipe, the flange of said outer pipe, and an insulating ring inserted between the flange of said inner pipe and the flange of said outer pipe.

4. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:

a power source;

a generally hollow cylindrical heater vessel arranged at the outlet of the intake passage and having an outlet portion which projects into the collecting portion of the intake manifold, said heater vessel comprising a hollow inner pipe having an outer wall, a hollow cylindrical outer pipe arranged around said inner pipe and heating means connected to said power source and being in contact with the outer wall of said inner pipe, said inner pipe arranged to be aligned with the intake passage and having a thin wall which has a corrugated cross-section;

a heat insulating plate having a hole and inserted between the intake passage and the collecting portion of the intake manifold, said heater vessel being inserted into the hole of said heat insulating plate, said heater vessel having an outwardly extending flange portion at an inlet portion thereof, which is located opposite to the outlet portion of said heater vessel, the hole of said heat insulating plate having an increased diameter portion into which the flange portion of said heater vessel is inserted, said outer pipe having an inwardly extending flange at said outlet portion, said inner pipe having an end face at said outlet portion, said heater vessel comprising an insulation ring inserted between the flange of said outer pipe and the end face of said inner pipe.

5. A fuel mixture heating device as claimed in claims 3 or 4, wherein each of said corrugated portions has a v-shaped cross-section and a v-shaped outer wall, a pair of said PTC elements which has a flat shape being arranged to be in contact with said v-shaped outer wall.

* * * * *